Oct. 24, 1967     M. C. HARRISON     3,348,319
X-RAY DEMONSTRATION PRISM
Filed May 24, 1965
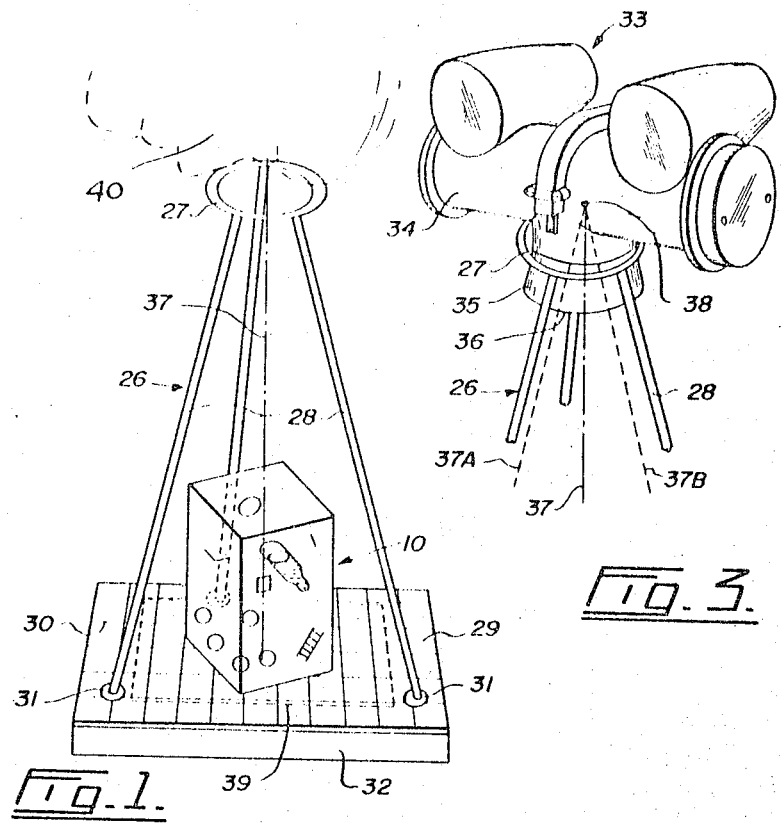
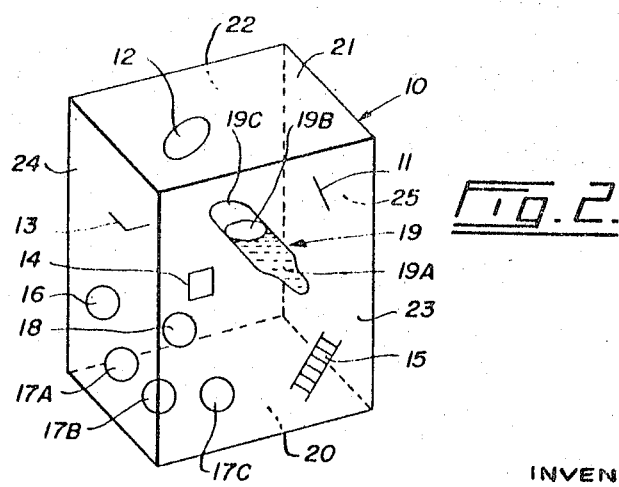
INVENTOR
MARY C. HARRISON
Ernest E. Carver
Agent United States Patent Office 3,348,319
Patented Oct. 24, 1967

3,348,319
X-RAY DEMONSTRATION PRISM
Mary C. Harrison, Suite 1509, 1450 Chestnut St.,
Vancouver 9, British Columbia, Canada
Filed May 24, 1965, Ser. No. 457,995
8 Claims. (Cl. 35—8)

ABSTRACT OF THE DISCLOSURE

For training X-ray technicians, a plastic prism transparent to light and X-rays, a number of randomly spaced objects imbedded in the prism some of the objects being transparent both to light and X-rays, some to light rays only, and some opaque both to light and X-rays; and apparatus for positioning the prism when exposing X-ray film and for positioning the eye when viewing the film.

My invention relates to a device for use in training students in the art of projection, particularly it is of value in the training of radiographers, radiologists, and others who are required to make, or to interpret, shadow effects such as for example, those produced by X-rays and light rays.

A student undergoing such training is required to learn to deduce the shape, and sometimes the nature, of an object from the shadow it casts.

The student commonly will lack knowledge of the geometric principles of projection. He will find difficulty in visualizing the shape of the shadow which a particular object will cast—since this shadow will vary, not only with the shape of the object itself, but with the position and orientation of the object with respect to the beam source, and with respect to the surface upon which the shadow is cast.

Variations in intensity of the shadow image will result from variations of opacity of the objects, and from variation in intensity and in quality of the beam.

In actual X-ray technology, whether of the human body or in industrial applications, the operator produces shadows of organs or of objects which he cannot see. The inherent difficulty of photographing an object which is not at the time visible to the technologist, and the inherent difficulty of the inverse problem of deducing the nature and shape of an object from its shadow, are reduced when the principles above are understood.

My device is adapted to demonstrate, both with light rays and with X-rays, the individual and combined effects upon the shadow images formed, for example, by objects of simple familiar geometric shape—thus permitting visual demonstration of these complex effects.

Referring particularly to medical-X-ray technology, the images on the film include those of all the tissues between the X-ray tube and the film, and this increases the difficulties both of producing and of analyzing shadows of a particular organ—notwithstanding that techniques, well known in the art, may be available to serve to emphasize the shadow image of the organ.

Since the student may be expected, initially, neither to be familiar with the principles of projection, nor to have other than slight knowledge of anatomy, one can appreciate the difficulty of acquiring knowledge of X-ray technology from the study of X-ray films of a human being. Duplications or variations of exemplary projections for teaching purposes are not used, because of radiation hazard to the patient.

An object of the invention is to reduce these difficulties by providing a prism, having at least two parallel faces, of material transparent both to light and to X-rays and having embedded therein a number of objects of common well known shapes, some of which objects are opaque both to light and to X-rays.

A further object is to provide ring means to position the port of an X-ray tube when radiographs of the prism are being made, the ring serving also to position the eye of an observer when radiographs are being viewed so that the position thereof with respect to a radiograph being viewed is substantially the same as that of the X-ray tube focal spot with respect to the negative when the radiograph was being made.

A still further object is to provide transparent graticuled plate means whereby the position of the prism relative to the negative during exposure is recovered with respect to the relative positions of prism and radiograph in viewing. For the purposes above, according to this invention there is provided a prism of material transparent to light and to X-rays, having embedded a number of objects some of which are of well known simple geometric shape and of material opaque both to light and to X-rays.

Details of the invention, and the way it is used to attain the above and other objects, will be apparent as the disclosure proceeds, reference being made to the accompanying drawings showing a preferred embodiment. It is to be understood that the description and drawings are illustrative thereof only, and that the scope of the invention is to be measured by the appended claims.

In the drawings:

FIGURE 1 shows the apparatus of the invention in use to view a radiograph.

FIGURE 2 is an enlarged view of the plastic block 10 of FIGURE 1.

FIGURE 3 shows a typical X-ray tube positioned to take a radiograph of the block 10.

All figures are in perspective.

The block 10 shown in FIGURES 1 and 2 is a right rectangular prism of plastic material. A right rectangular prism is preferred, although a block having not less than two parallel plane faces may be used. The material of the block is transparent to light and to X-rays, and embedded therein are objects later described in detail.

A number of plastics have suitable physical properties and have been used to display embedded botanical, zoological and other specimens. The methyl methacrylate monomer produced by E. I. du Pont de Nemours & Co., Inc., of Wilmington, Del., U.S.A., and known as "Lucite" acrylic resin is suitable. The process of making such blocks of this material, and embedding objects in them, is well known and therefore is not herein described in detail.

Referring particularly to FIGURE 2 the embedded objects 11–16 are of simple geometric shapes and of a material opaque both to light rays and to X-rays, a dense metal such as lead is suitable. As well, use could be made of materials having different grades of opacity with respect to X-rays, so as to produce shadow images of differing densities. I prefer however to use a dense material for these objects, as better attaining the purposes of my invention.

The numeral 11 represents a thin straight rod, 12 is a disc, 13 is an L-shaped object formed of thin rod the arms of the L at right angles, 14 is a thin rod bent to the shape of a hollow square, 15 is a ladder-like object of thin rod, 16 is a metal sphere.

17A, B, C are spheres of colored plastic and, while transparent to X-rays or nearly so, are visible to the eye.

18 is a bubble formed in the block 10, it contains air or other gas which will not interact with the plastic material of the block. The bubble will not show on the radiogram.

The numeral 19 indicates generally a sealed glass vial and its contents. The vial itself is transparent both to light and to X-rays, it is partially filled with a liquid 19A having a surface 19B. The liquid is transparent to light but not to X-rays. A liquid such as a 50% aqueous solution of the diatrizoate sodium, "Hypaque," produced by Winthrop Laboratories of Canada Ltd., Aurora, Ontario, Canada, is suitable. Other such liquids are well known in the art and are available from common suppliers. The space 19C, within the vial and above the surface 19B, may be air.

The right rectangular prism, or block, 10 has bottom and top faces 20, 21, back and front faces 22, 23, and side faces 24, 25.

The spherical objects 16–17C and the bubble 18 should be grouped together, the plane of the ladder 15 is desirably at an acute angle to the base 23. Otherwise the objects may be randomly spaced separate from one another, generally in three dimensions as seen in FIGURES 1 and 2.

The size of the block 10 is not critical, a height of eight or ten inches with a four by five inch base is suitable, and the plastic can be built up to this height without undue difficulty. This size permits adequate spacing of the various objects.

Referring now to FIGURE 1, the numeral 26 indicates generally a tripod having a ring shaped head 27 the inside diameter of which is adapted to receive the port of an X-ray tube, not shown in FIGURE 1. Legs 28 of equal length are rigidly secured to the head in any convenient manner.

The tripod rests upon a base plate 29. The plane of the head 27 parallel thereto. The base is of material transparent both to light and to X-rays, a sheet of plastic is suitable. A surface of the base plate is marked with a rectangular grid graticule 30, the surface has also markings such as 31 serving as means to locate the position of the legs with respect to the plate. The grid is visible to the eye but transparent to X-rays, and thus may simply be scribed on the plastic surface.

The base plate rests upon the translucent upper surface of a viewing box 32, well known in the art. In lieu of the viewing box 32, any back lighted translucent viewing means, for example a light table, may be used.

FIGURE 3 shows a typical X-ray tube 33 having a body 34 and a port 35. The port is generally cylindrical having an outer face 36. The inside diameter of the tripod head ring 27 is somewhat greater than the greatest outside diameter of the port 36 so that the port may pass through the ring. The centre line of the port is indicated by the numeral 37, which thus represents the perspective axis. Outside rays of a cone of X-rays emitted from the tube are indicated by the broken lines 37A, B. The focal spot 38 lies on the perspective axis 37 somewhat within the body 34. In a typical tube the distance along 37 from the port outer face 36 to the focal spot may be about 3½ inches.

Alternative to the tripod leg means 28 illustrated, other obvious means may be used to support the ring 27 in a fixed, or recoverable, position—for example, a fixed or movable bracket.

The apparatus may be used in the following manner.

To prepare X-ray radiographs, a conventional X-ray film holder envelope containing unexposed film is placed upon any suitable surface, the top of the viewing box 32 FIGURE 1 may be used. The position of the envelope is indicated by the broken outline 39. The gridded plate 29 is now placed on top of the envelope. The position of the edges of the envelope with relation to the graticule is to be recorded. If desired, X and Y graticule axes may be numbered and/or lettered to facilitate this operation.

The block 10 is now set on the base plate as shown in FIGURE 1, and the position of the block edges with relation to the graticule is also recorded. The tripod is now set in the gridded plate, the ends of the legs in register with the marks 31 aforesaid provided for that purpose.

X-ray tubes are commonly used in a universal mount giving such degree of freedom to the tube that, within the limits of the amount motions, the axis of the tube can be pointed in any required direction, from any required point. The mount is not herein illustrated.

The port of the tube is now placed within the tripod head ring as shown in FIGURE 3, so that the body of the tube is touching or just clear of the ring, with the axis 37 directed downward, normal to the plane of the base plate.

A radiogram is now made in the ordinary way.

Exposures may similarly be made with different faces of the block in contact with the base plate, the resultant radiographs will show different aspects of the various embedded objects. In each such exposure, the position of the block face in contact with the base plate 29 with reference to the graticule 30 is to be recorded as before.

To view these radiograms, the processed X-ray negative is substituted for the film holder, the negative in the same position with respect to the gridded plate as when the exposure was made, that is in the position shown by the broken outline 39. This position is recovered by means of the previously recorded position of the envelope edges.

The block is then placed upon the base, with the same face in contact therewith as when the particular exposure being studied was made, and is set to the same position as it occupied when the exposure was being made, which position is recovered from the previously recorded edge positions with respect to the grid.

The tripod is set upon the plate the legs in register with the marks 31. The eye of the observer is placed substantially in the centre of the ring as indicated, in FIGURE 1, by the broken outline 40 indicating the head of the observer. Thus the eye will be substantially at the position of the focal spot when the exposure was made.

It will now be observed that the X-ray images are obscured by the corresponding embedded objects.

It will also be noted that coincidence is obtained with respect to objects and images at or close to the axis. Off-axis light rays are refracted passing through the block, to emerge parallel with the incident rays but radially displaced, hence exact coincidence is not obtained with respect to the off-axis objects, since the X-rays are not so refracted.

This effect does not detract from the value of the demonstration, in fact, the double image effect facilitates observation and comparison. A prism having opposite faces which are not parallel would be operative for the subject purpose, but the refraction would be greater—hence a prism having at least two parallel faces is preferred, and a right rectangular prism is more convenient.

By means of the foregoing procedures, many principles of perspective may be demonstrated, and when the student has become familiar with such demonstrations, the tripod and grid may be dispensed with. In fact after some familiarization the student will be able to effect comparison between a series of radiograms, which may for convenience be viewed in a vertical position by means well known in the art, holding the plastic block in one hand and observing block and radiograph simultaneously.

It will be recognized that, in all of the foregoing, the perspective axis has been normal to the negative plane. In practice it is often required that radiographs be made with the axis inclined to the negative plane. To simulate these conditions, radiographs may be made, for example, with the axis of the X-ray tube directed against the face of each side of the prism in turn, at an angle of say 30°. These, studied in conjunction with previously taken radiograms with the axis normal, will demonstrate the change in shape of the X-ray image of the embedded objects. Such radiograms may be viewed and compared as last above described.

It will early become apparent to the student that a single radiograph conveys incomplete, and even misleading, information as to the shape of an object. Two radiographs taken at right angles can convey more information but that information may still be incomplete. Even three radiographs taken mutually at right angles may not completely define the object. It then becomes evident that numerous radiographs taken at different angles may be necessary, and this is readily demonstrated with the use of my device.

The embedded objects are adapted to show the following particular effects.

The metal rod 11 may be shown to cast a shadow image either longer or shorter than its actual size, or may project as a point.

The disc 12 may project as a circular or as an elliptical shadow, or as a straight line.

The right angled L, 13, may project to show an interior angle from 0° to 180° depending upon its orientation.

The hollow square 14 may appear as a straight line or as a trapezoid.

The "ladder" 15 may cast shadows bearing little resemblance to the object.

The shadow of the sphere 16 will be sensibly circular when it is formed by nearly axial rays normal to the negative plane, and for off-axial rays whether or not the axis is normal to the negative plane, the shadow will be oval.

The colored plastic spheres 17A, B, C, to simulate for example gallstones, and the bubble 18, will not show on the radiograph. This is to demonstrate that such objects should not be expected to show on a radiograph.

The radiopaque contents of the vial 19 will also exhibit a variety of image shapes, according to position and orientation.

The particular embedded objects are well adapted for demonstration purposes, but other objects can be used additionally to or in substitution. For example, a square of thin metal may be substituted for the hollow square 14, and a rectangular shape could be used. The disc 12 could similarly be a ring. Other familiar common objects, a helix, a nut, can also be used to demonstrate the difference between the objects themselves and the radiograph images. I consider it to be essential that, whatever objects are chosen, they include simple well known geometric shapes for ready initial familiarization with the principles of image formation.

I claim:

1. Apparatus for use in the training of X-ray technicians, adapted for the taking of radiographs using an X-ray tube having a port, and an X-ray film holder, and adapted for the viewing of said radiographs by an observer by means of a viewing box having an upper surface, the said apparatus including in combination:
    (a) a transparent base plate having an upper surface and a lower surface, grid markings on a said surface, the plate adapted so that its lower surface is in contact with the X-ray film holder in making X-ray exposures, and adapted for placing over a radiograph resting upon the upper surface of a viewing box,
    (b) resting on the upper surface of the base plate a prism or block of material transparent both to light and to X-rays, imbedded at random positions within the prism a number of objects, spaced from one another generally in three dimensions, some of the objects being of well known simple geometric shape and of material opaque both to light rays and to X-rays,
    (c) means to position the X-ray tube with respect to the prism when making radiographs thereof, which positioning means is also adapted to position the eye of the observer when the radiographs are being viewed.

2. Apparatus as defined in claim 1 in which the positioning means includes: a ring of internal diameter slightly larger than the greatest external diameter of the X-ray tube port, and means to support the ring.

3. For use in training of X-ray technicians, a prism or block of material transparent to light and to X-rays having; a number of objects embedded therein at random positions, the objects including some having common well known shapes, some being opaque to light rays and opaque to X-rays and in mutually spaced non-coplanar relationship to one another; wherein the objects opaque to light rays and to X-rays are of simple geometric shapes; having other embedded objects including colored objects transparent to X-rays; and a vial partially filled with a radiopaque liquid, the said vial being of material transparent both to light and to X-rays.

4. A prism as defined in claim 3, wherein the objects of simple geometric shape include; a thin rod, a disc, an L-shaped object, a hollow square, a ladder-like object, and a sphere.

5. Apparatus as defined in claim 2 having a prism wherein the objects opaque to light rays and to X-rays are of simple geometric shapes, and wherein the other objects include colored objects transparent to X-rays, and a vial partially filled with a radiopaque liquid, the said vial being of material transparent both to light and to X-rays.

6. A prism as defined in claim 5, wherein the objects of simple geometric shape include; a thin rod, a disc, an L-shaped object, a hollow square, a ladder-like object, and a sphere.

7. For use in the training of X-ray technicians, a right rectangular prism or block of material transparent to light and to X-rays having; a number of objects embedded therein at random positions, the objects including some having common well known shapes, some being opaque to light rays and opaque to X-rays and in mutually spaced non-coplanar relationship to one another; wherein the objects opaque to light rays and to X-rays are of simple geometric shapes; having other embedded objects including colored objects transparent to X-rays; and a vial partially filled with a radiopaque liquid, the said vial being of material transparent both to light and to X-rays.

8. A prism as defined in claim 7, wherein the objects of simple geometric shape include; a thin rod, a disc, an L-shaped object, a hollow square, a ladder-like object, and a sphere.

References Cited
UNITED STATES PATENTS

| | | | |
|---|---|---|---|
| 1,821,252 | 9/1931 | Woods | 33—64 |
| 2,350,421 | 6/1944 | Schoder et al. | 264—255 |
| 2,848,748 | 8/1958 | Crump. | |
| 3,111,582 | 11/1963 | Levi | 250—59 |

EUGENE R. CAPOZIO, *Primary Examiner.*

H. S. SKOGQUIST, *Assistant Examiner.*